United States Patent
Mahoutian

(10) Patent No.: US 11,358,902 B2
(45) Date of Patent: Jun. 14, 2022

(54) PRODUCTION OF WET-CAST SLAG-BASED CONCRETE PRODUCTS

(71) Applicant: CARBICRETE INC., Montreal (CA)

(72) Inventor: Mehrdad Mahoutian, Montreal (CA)

(73) Assignee: CARBICRETE INC, Montreal (CA)

( * ) Notice: Subject to any disclaimer, the term of this patent is extended or adjusted under 35 U.S.C. 154(b) by 0 days.

(21) Appl. No.: 17/308,412

(22) Filed: May 5, 2021

(65) Prior Publication Data

US 2021/0253480 A1    Aug. 19, 2021

Related U.S. Application Data

(63) Continuation of application No. 17/202,435, filed on Mar. 16, 2021, which is a continuation of application No. PCT/CA2020/050466, filed on Apr. 9, 2020.

(60) Provisional application No. 62/832,956, filed on Apr. 12, 2019.

(51) Int. Cl.
   *C04B 28/08* (2006.01)
   *B28B 11/24* (2006.01)
   *B28B 23/02* (2006.01)
   *C04B 40/02* (2006.01)

(52) U.S. Cl.
   CPC .......... *C04B 28/082* (2013.01); *B28B 11/24* (2013.01); *B28B 23/02* (2013.01); *C04B 28/085* (2013.01); *C04B 40/0231* (2013.01)

(58) Field of Classification Search
   CPC ....... C04B 28/08; C04B 28/085; C04B 40/02; C04B 40/024; C04B 40/0231; C04B 2111/00068; C04B 2111/00077; C04B 2111/00103; C04B 40/006; C04B 40/0067; C04B 40/0096; C04B 40/0236; C04B 40/025; C04B 40/0254; B28B 1/14; B28B 11/242; B28B 11/245
   USPC ......................................... 264/29.1
   See application file for complete search history.

(56) References Cited

U.S. PATENT DOCUMENTS

| | | | |
|---|---|---|---|
| 4,588,443 A * | 5/1986 | Bache | C04B 18/146 106/644 |
| 4,588,543 A | 5/1986 | Shimizu | |
| 5,021,205 A | 6/1991 | Niioka | |
| 5,250,113 A | 10/1993 | Berke | |

(Continued)

FOREIGN PATENT DOCUMENTS

| CA | 2942401 A1 | 9/2015 |
|---|---|---|
| WO | 2017000075 A1 | 1/2017 |

(Continued)

OTHER PUBLICATIONS

International Search Report for corresponding application PCT/CA2020/050467 filed Apr. 9, 2020; Report dated Jun. 22, 2020.

(Continued)

*Primary Examiner* — Francisco W Tschen
*Assistant Examiner* — Edgaredmanuel Troche
(74) *Attorney, Agent, or Firm* — Cantor Colburn LLP

(57) ABSTRACT

The present description relates to a method of producing a wet-cast slag-based concrete product particularly where the wet-cast slag-based concrete product is partially or completely set inside a mould, pre-conditioned outside of the mould and then cured with carbon dioxide in a curing chamber. The wet-cast slag-based concrete product is optionally reinforced.

18 Claims, 2 Drawing Sheets

(56) References Cited

U.S. PATENT DOCUMENTS

| | | | |
|---|---|---|---|
| 5,366,549 A | 11/1994 | Imaizumi | |
| 10,338,053 B2 | 7/2019 | Atakan | |
| 10,350,787 B2 | 7/2019 | Forgeron | |
| 10,570,064 B2 | 2/2020 | Monkman | |
| 2014/0197563 A1* | 7/2014 | Niven | B28B 1/08 |
| | | | 264/69 |
| 2015/0141552 A1* | 5/2015 | Takizawa | B28B 23/0006 |
| | | | 524/4 |
| 2017/0036372 A1* | 2/2017 | Sandberg | B28B 1/26 |
| 2017/0073270 A1* | 3/2017 | Shao | B28B 11/245 |
| 2017/0102373 A1* | 4/2017 | Atakan | C04B 28/04 |
| 2017/0241871 A1* | 8/2017 | Mayelle | C04B 28/087 |
| 2019/0077045 A1 | 3/2019 | Monkman | |
| 2019/0168416 A1 | 6/2019 | Monkman | |
| 2020/0181032 A1* | 6/2020 | Michud | C04B 40/0067 |
| 2021/0107834 A1 | 4/2021 | Seth | |

FOREIGN PATENT DOCUMENTS

| | | |
|---|---|---|
| WO | 2017041176 A1 | 3/2017 |
| WO | 2017041188 A1 | 3/2017 |
| WO | 2017075126 A1 | 5/2017 |
| WO | 2017127454 A1 | 7/2017 |
| WO | 2017152120 A1 | 9/2017 |
| WO | 2017155899 A1 | 9/2017 |
| WO | 2017177324 A1 | 10/2017 |
| WO | 2017192938 A1 | 11/2017 |
| WO | 2017210294 A1 | 12/2017 |
| WO | 2018058139 A1 | 3/2018 |
| WO | 2018175748 A1 | 9/2018 |
| WO | 2018175769 A1 | 9/2018 |
| WO | 2018232507 A1 | 12/2018 |
| WO | 2019060992 A1 | 4/2019 |
| WO | 2019101809 A1 | 5/2019 |
| WO | 2019101810 A1 | 5/2019 |
| WO | 2019101811 A1 | 5/2019 |
| WO | 2019112555 A1 | 6/2019 |
| WO | 2019165275 A1 | 8/2019 |
| WO | 2019165281 A1 | 8/2019 |
| WO | 2020046927 A1 | 3/2020 |
| WO | 2020124054 A1 | 6/2020 |
| WO | 2020217232 A1 | 10/2020 |
| WO | 2021071980 A1 | 4/2021 |

OTHER PUBLICATIONS

International Search Report PCT/CA2020/050466 filed Apr. 9, 2020; dated Jun. 10, 2020.

Written Opinion of the International Searching Authority for corresponding application PCT/CA2020/050467 filed Apr. 9, 2020; Report dated Jun. 22, 2020.

Written Opinion of the International Searching Authority for PCT/CA2020/050466 filed Apr. 9, 2020; dated Jun. 10, 2020.

* cited by examiner

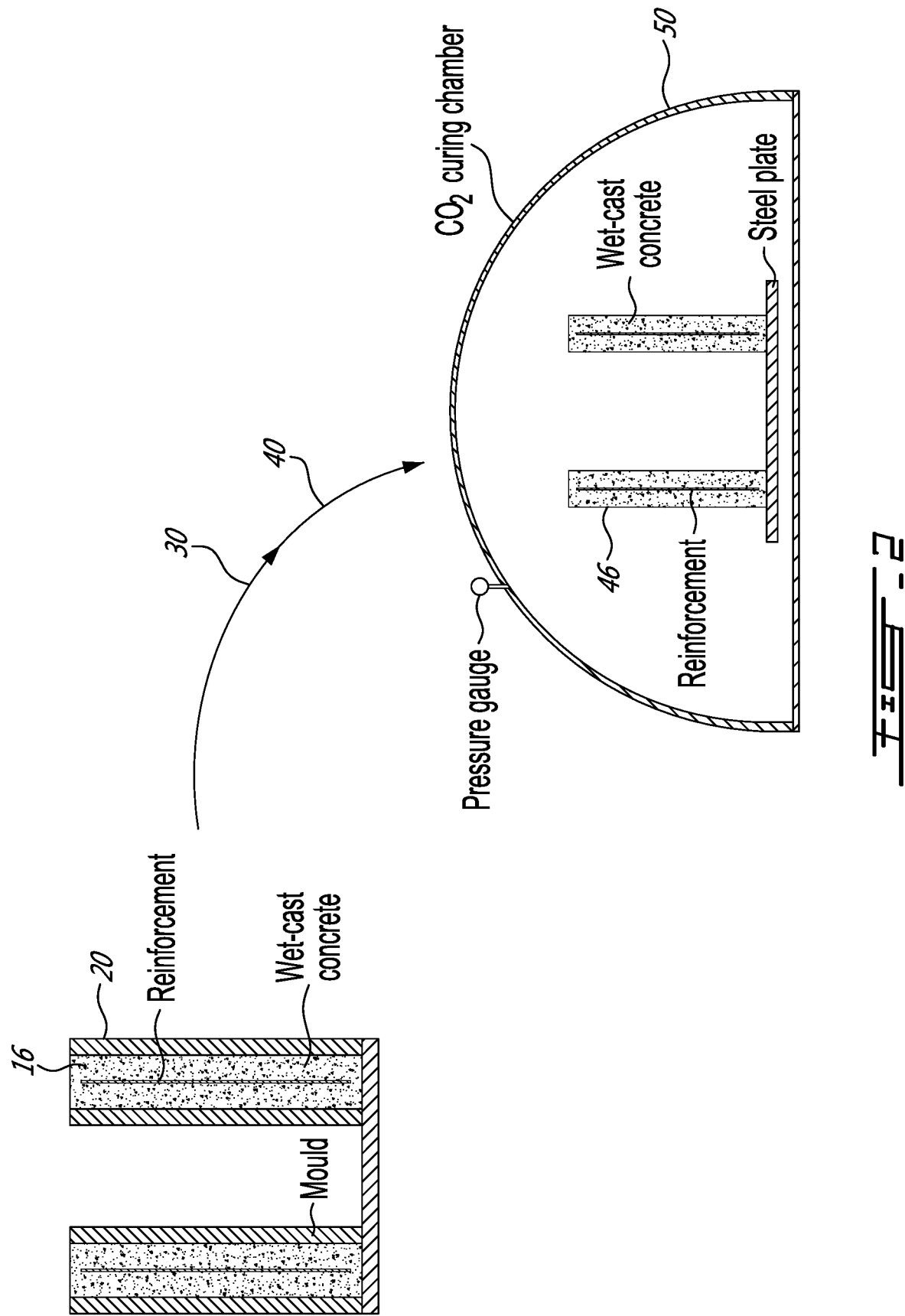

PRODUCTION OF WET-CAST SLAG-BASED CONCRETE PRODUCTS

CROSS REFERENCE TO RELATED APPLICATIONS

This application is a continuation of U.S. patent application Ser. No. 17/202,435 which was filed on Mar. 16, 2021 as a continuation of International Patent Application Number PCT/CA2020/050466 filed on Apr. 9, 2020, which claimed priority to U.S. Provisional Patent Application No. 62/832,956 filed on Apr. 12, 2019, the contents of all of which said applications are incorporated herein by reference in their entirety.

TECHNICAL FIELD

The present description relates to a method of producing a wet-cast slag-based concrete product particularly where the wet-cast slag-based concrete product is partially or completely set inside a mould, pre-conditioned outside of the mould and then cured with carbon dioxide in a curing chamber. The wet-cast slag-based concrete product is optionally reinforced.

BACKGROUND OF THE INVENTION

Metallurgical slag is an abundant waste material that is usually landfilled. Metallurgical slag may act as a binder material under appropriate conditions. Finding new uses for metallurgical slag, including steel slag, are required.

SUMMARY

Development of concrete products, that are optionally reinforced, and made from a metallurgical slag as the main binder and carbon dioxide with the wet-cast method is explained herein.

In accordance with one aspect there is provided a method of producing a wet-cast slag-based concrete product comprising steps of: providing a composition for a non-zero-slump concrete, the composition comprising a slag-based binder, an aggregate and water; mixing the slag-based binder, the aggregate and the water to produce the non-zero-slump concrete comprising a first water to binder ratio by weight of greater than 0.2; casting the non-zero-slump concrete by transferring the non-zero-slump concrete into a mould; setting the non-zero-slump concrete partially or fully within the mould to produce a slag-based intermediate comprising a second water to binder ratio by weight that is less than the first water to binder ratio by weight; demoulding the slag-based intermediate to produce a demoulded intermediate; pre-conditioning the demoulded intermediate to produce a demoulded conditioned slag-based intermediate comprising a third water to binder ratio by weight that is less than the first water to binder ratio by weight and that is also less than the second water to binder ratio by weight; and curing the demoulded conditioned slag-based intermediate with carbon dioxide to activate the conditioned slag-based intermediate and produce the wet-cast slag-based concrete product.

In accordance with another aspect there is provided the method described herein, wherein the casting of the non-zero-slump concrete is free of pressing/compaction.

In accordance with another aspect there is provided the method described herein, wherein the slag-based binder is a slag—free of or mixed with at least one other binder selected from the group further consisting of fly ash, calcinated shale, silica fume, zeolite, GGBF (Ground Granulated Blast Furnace) slag, limestone powder, hydraulic cements and non-hydraulic cements.

In accordance with yet another aspect there is provided the method described herein, wherein the slag is selected from the group consisting of a steel slag, a stainless steel slag, a basic oxygen converter sludge, blast furnace sludge, a by-product of zinc, iron, copper industries and combinations thereof.

In accordance with still yet another aspect there is provided the method described herein, further comprising a reinforcing step of placing a reinforcing material into the mould before the casting step.

In accordance with still yet another aspect there is provided the method described herein, wherein the reinforcing material is carbon steel, stainless steel and/or fiber reinforced polymer (FRP) reinforcement bars.

In accordance with still yet another aspect there is provided the method described herein, wherein a cumulative calcium silicate content of the slag is at least 20 weight %.

In accordance with still yet another aspect there is provided the method described herein, wherein the pre-conditioning increases porosity of at least 1% of volume of the wet-cast slag-based concrete.

In accordance with still yet another aspect there is provided the method described herein, wherein the non-zero-slump concrete has a slump value in a range of 5 mm to 250 mm.

In accordance with still yet another aspect there is provided the method described herein, wherein the non-zero-slump concrete has a compaction factor test for the fresh concrete must find a value in the range of 0.7 to 1.0.

In accordance with still yet another aspect there is provided the method described herein, wherein the steel slag is selected from the group consisting of reducing steel slag, oxidizing steel slag, converter steel slag, electrical arc furnace slag (EAF slag), basic oxygen furnace slag (BOF slag), ladle slag, fast-cooled steel slag and slow-cooled steel slag and combinations thereof.

In accordance with still yet another aspect there is provided the method described herein, wherein the wet-cast slag-based concrete is further processed to a product selected from the group consisting of precast, reinforced and non-reinforced concrete pipes, box culverts, drainage products, paving slabs, floor slabs, traffic barriers, walls manholes, retaining wall, pavers, tiles, and shingles.

In accordance with still yet another aspect there is provided the method described herein, wherein the wet-cast slag-based concrete comprises of a slag content of at least 5% by weight.

In accordance with still yet another aspect there is provided the method described herein, wherein the non-zero-slump concrete further comprises at least one accelerator, retarder, viscosity modifying agent, air entertainer, foaming agent, ASR (alkali silicati reaction) inhibitor, anti-wash-out, corrosion inhibitor, shrinkage reducer, concrete crack reducer, plasticizer, super plasticizer, sealer, paint, coating, water reducer, water repellant, efflorescence control, polymer powder, polymer latex and workability retainer.

In accordance with still yet another aspect there is provided the method described herein, wherein the non-zero-slump concrete further comprises at least one cellulose fiber, glass fiber, micro synthetic fiber, natural fiber, polypropylene (PP) fiber, polyvinyl alcohol (PVA) fiber and steel fiber.

In accordance with still yet another aspect there is provided the method described herein, wherein the $CO_2$ curing is free of additional external sources of heat/energy.

In accordance with still yet another aspect there is provided the method described herein, wherein the demoulded conditioned slag-based intermediate is cured in a chamber/enclosed space/vessel/room with a gas containing a concentration of $CO_2$ of at least 5% by volume.

In accordance with still another aspect there is provided the method described herein, wherein in producing 1 m³ of the wet-cast slag-based concrete product, the first water to binder ratio of the non-zero-slump concrete was 0.45 with a time for the setting the non-zero-slump concrete of 18 hours.

In accordance with still another aspect there is provided the method described herein, wherein the producing 1 m³ of the wet-cast slag-based concrete product began with a mass of 350 kg or 480 kg of the slag.

In accordance with still yet another aspect there is provided the method described herein, wherein the demoulding occurs when the demoulded intermediate has a compressive strength of at least 0.01 MPa.

DESCRIPTION OF THE DRAWINGS

Reference is now made to the accompanying figures, in which:

FIG. 2 is a schematic representation of the casting and the $CO_2$ curing steps according to one embodiment described herein.

DETAILED DESCRIPTION

Figure 1:
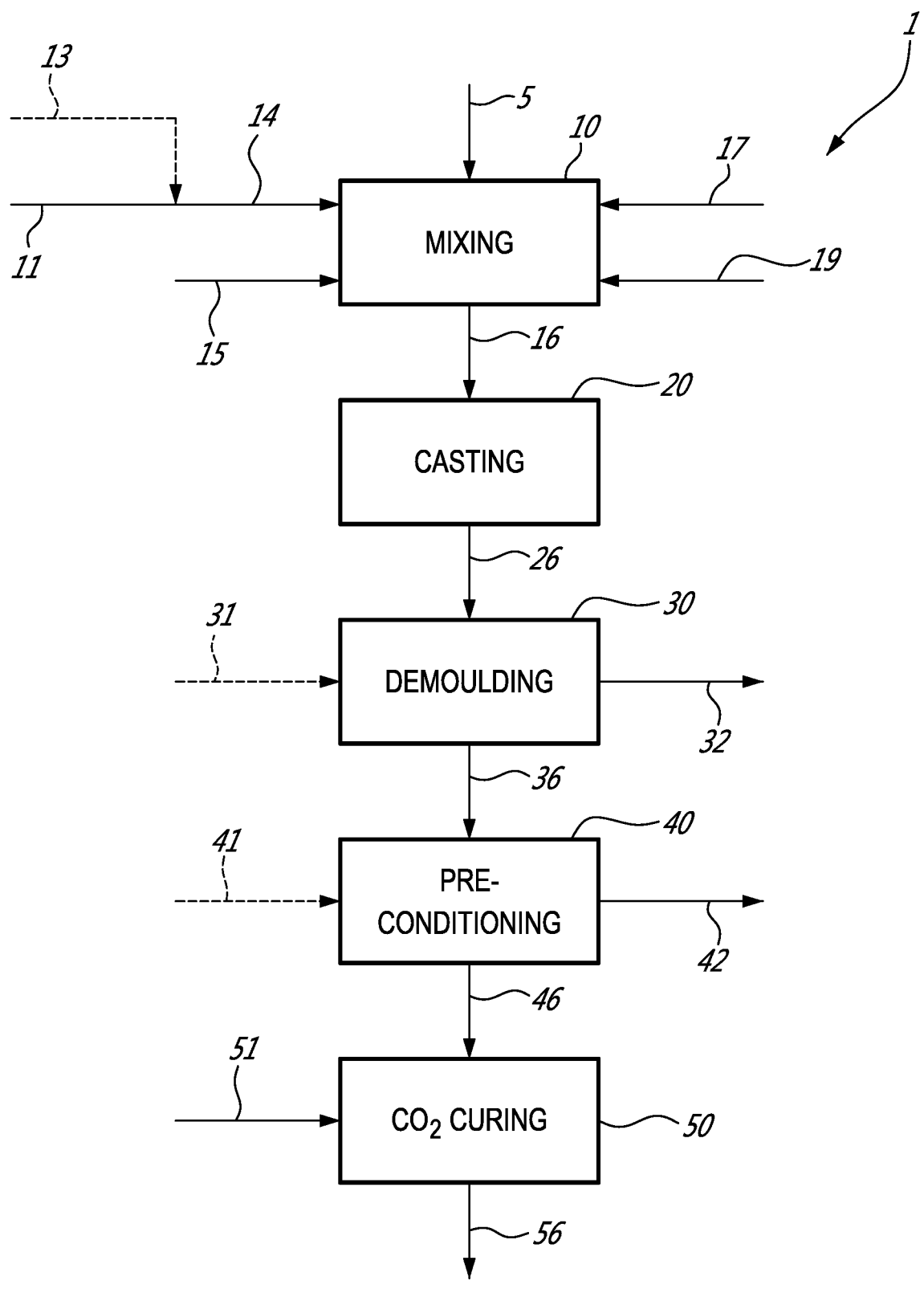
FIG. 1. is a process block diagram illustrating a method of producing a wet-cast slag-based concrete product according to one embodiment of described herein.

Traditionally, newly sintered Portland cement is used as the binder in concrete production, and wet-cast cement-based precast concrete products are commonly cured with heat and steam. The present innovation of wet-cast slag-based concrete in contrast uses by-products of metallurgical plants and in a preferred embodiment—steelmaking factories as the main binder to replace Portland cement in production of concrete and precast products. In addition, carbon dioxide is used as an activator to cure the concrete and is sequestered in the process. In preferred embodiment, no additional heat or steam are needed during the $CO_2$ curing process. The proposed wet-cast slag-based concrete products, that are optionally reinforced, may show equal or superior mechanical and durability properties when compared to the traditional cement-based precast products, while their production would reduce greenhouse gas emissions to the atmosphere. The proposed innovation would also reduce consumption of natural resources, both as conventional cement is not used in the slag-based concrete products and as a lower amounts of aggregate content are needed in the slag-based concrete products. Finally, the production of wet-cast slag-based concrete products, optionally reinforced, according to the proposed innovation may increase production rate at the precast concrete making facilities.

Materials

The main binder in the production of wet-cast slag-based concrete 56 is a slag 11 that in a preferred embodiment derives from steel or stainless steel production. Other by-product materials from zinc, iron, and copper production can also be considered as the slag 11.

Various slags 11 can be collected from steel factories that practice different methods of steel production. Among the types of slag 11 that can be incorporated as the main binder in production of wet-cast slag-based concrete described herein is: stainless steel slag, reducing steel slag, oxidizing steel slag, converter steel slag, electrical arc furnace slag (EAF slag), basic oxygen furnace slag (BOF slag), ladle slag, fast-cooled steel slag, slow-cooled steel slag, basic oxygen converter sludge, blast furnace sludge and combinations thereof.

The calcium oxide content by weight of slag 11 in a preferred embodiment is more that 10%, preferably more than 15%, preferably more than 20%. The silica oxide content by weight in a preferred embodiment is more than 6%, preferably more than 8%, preferably more than 12%. The total iron oxide content of slag in a preferred embodiment is less than 40%, preferably less than 30%. Steel slag 11 in a preferred embodiment has a cumulative calcium silicate content of at least 20% and a free lime concentration of less than 15%, and preferably less than 7% slag. The bulk density of the slag 11 in a preferred embodiment has a range of 1.0 to 2.0 g/cm³ and an apparent density may vary from 2.0 to 6.0 g/cm³.

The slag 11 may be ground to a smaller size (if required) before being incorporated into the wet-cast slag-based concrete mix described herein. Grinding the slag 11 can be performed with any mechanical machine such as a ball mill, rod mill, autogenous mill, SAG mill, pebble mill, high pressure grinding rolls, VSI or tower mill. The grinding process can be executed either wet or dry. While a dry size reduction process is preferred, if the wet process is chosen for grinding the slag, the ground slag can be either dried completely or semi-dried after grinding. Passing the slag through a classifier(s) is an alternative option to obtain slag 11 with a smaller particle/grain size. The classifiers used are known in the art and include but are not limited to: screens; centrifuges and cyclones.

Ground or classified slags 11 in a preferred embodiment pass through a mesh #10 (2000 microns), preferably a mesh #50 (297 microns), preferably a mesh #200 (74 microns), preferably a mesh #400 (37 microns) each of which can be used alone or in combination with at least one other binder 13. Sieves may be utilized to screen slags either after or before grinding. Thus, one or combination of grinding and screening methods can be executed in order to obtain slag 11 with a proper particle size distribution.

The slag 11 may be pulverized and/or screened to a Blaine fineness of at least 50 m²/kg and preferably, 150 m²/kg, and preferably at least 200 m²/kg. In a preferred embodiment the slag 11 in slag-based wet concrete, fifty percent of slag is smaller than 200 microns (D50=200 µm), preferably smaller than 150 microns (D50=150 µm), preferably smaller than 100 microns (D50=100 µm), preferably smaller than 50 microns (D50=50 µm), preferably smaller than 25 microns (D50=25 µm), preferably smaller than 10 microns (D50=10 µm).

The free lime content of the slag 11 may be reduced with any standard known method in the prior art before it is incorporated into the mix. Alternatively, the slag can first be aged to reduce its free calcium oxide (free lime) content and then incorporated into the mix. Slag 11 content of wet-cast slag-based concrete should be no less than 5% of the weight of concrete, preferably no less than 20% of the weight of the wet-cast slag-based concrete or the non-zero-slump concrete composition.

The slag-based binders 14 may further comprise: a slag alone (i.e. a slag that is-free of another binder) or be a combination of slag with at least one other binder 13, such as cementitious materials/pozzolanic materials. As an example, slag 11 can be mixed with at least one other binder 13 producing a slag-based binder 14 further comprising: fly ash, calcinated shale, silica fume, zeolite, GGBF (Ground Granulated Blast Furnace) slag, limestone powder, hydraulic cements, non-hydraulic cements and combinations thereof.

Various types of aggregate 15—including natural or artificial normal weight and lightweight aggregates—can be incorporated into the slag-based wet concrete product as filler in the production of wet-cast slag-based concrete product. Examples of potential lightweight aggregates includes natural lightweight aggregate (e.g. pumice), expanded clay aggregate, expanded shale aggregate and expanded iron slag aggregate. Other usable aggregates include: crushed stone, manufactured sand, gravel, sand, recycled aggregate, granite, limestone, quartz, chalk powder, marble powder, quartz sand and artificial aggregate. These aggregates are incorporated into the mix as fine and/or coarse aggregates. Aggregate content can be as high as 90% of the weight of the wet-cast slag-based concrete or the non-zero-slump concrete composition.

The proposed slag-based wet concrete 56 is a workable concrete. Enough water should be added to the dry ingredient in order to produce a wet concrete (in contrast with slump-zero concrete). The required water content depends on the grain size of the slag chosen as the main binder and on the moisture content of the aggregates and content of binder. Finer ground slags absorb more water, so a higher water content would be required to produce wet concrete. Water-to binder ratio, in mass, can be 0.9, preferably 0.8, preferably 0.7, preferably 0.6, preferably 0.5, preferably 0.4, preferably 0.3, or preferably 0.2. For example, for the binder consisting of only slag with D50 of 25 microns, the water to binder ratio of 0.4 can result in a workable wet concrete. It may be the case that no additional water is required in the mix if the aggregates are very wet.

Chemical admixtures 17 can be introduced into the mix if required. Chemical admixtures 17 when introduced into the mix satisfy specific properties. Possible chemical admixtures 17 include but are not limited to: accelerators, retarders, viscosity modifying agents, air entertainers, foaming agents, ASR (alkali silica reaction) inhibitors, anti-wash-out, corrosion inhibitors, shrinkage reducers, crack reducers, plasticizers, super plasticizers, water reducers, water repellants, efflorescence controls and workability retainers.

Fibers can be added if required to the slag-based wet concrete. One or combination of cellulous fiber, glass fiber, micro synthetic fibers, micro synthetic fibers, natural fibers, PP fibers, PVA fibers and steel fibers can be incorporated into the mix.

The "zero-slump concrete" is defined as a concrete of stiff or extremely dry consistency showing no measurable slump after removal of the slump cone. A standard exemplary slump test is ASTM C143, for Hydraulic-Cement Concrete. A non-zero-slump concrete 16 is a concrete that is not stiff nor extremely dry consistency showing a measurable slump after removal of the slump cone by a test such as ASTM C143. The slump values herein are assessed using the method described in the ASTM C143 standard.

The method 1 of producing a wet-cast slag-based concrete 56 can be adapted to produce a variety of products including but not limited to precast, reinforced concrete pipes, box culverts, drainage products, paving slabs, floor slabs, traffic barriers, walls, manholes, precast non-reinforced concrete (plain) pavers, retaining walls, tiles and shingles. The products shall satisfy local and national standards and codes.

Referring to FIG. 1, one embodiment of a method 10 of producing a wet-cast slag-based concrete 56 is provided.

(i) Wet-Cast Slag-Based Concrete 56 Production.

The method 1 of wet-cast slag-based concrete 56 begins by providing a composition of a non-zero-slump concrete 16 and uniformly mixing 10 all ingredients of a composition that include but are not limited to: a slag 11 and an optional at least one other binder 13 (providing a slag-based binder 14), an aggregate 15, chemical admixtures 17, fibers 19 and water 5. The water-to-binder ratio of the wet-cast slag-based concrete 56 used in this innovation should be higher than the water content of dry-cast or zero-slump concrete. In a preferred embodiment the mixed non-zero-slump concrete 16 has a first water to binder ratio by weight of greater than 0.2, preferably 0.25, preferably 0.3, preferably 0.35, preferably 0.4, preferably 0.45, preferably 0.5, preferably 0.55, preferably 0.6 or preferably 0.65. The terms "water to slag-based binder ratio by weight" and "water to binder ratio by weight" are equivalents.

The non-zero-slump concrete 16 will preferably have a slump range of 5 to 250 mm. The non-zero-slump concrete 16 is preferably workable for at least 5 minutes. The mixing 10 should ensure that the non-zero-slump concrete 16 is free of signs of segregation or bleeding. The compaction factor test for the non-zero-slump concrete 16 in a preferred embodiment is in a range of 0.7 to 1.0. The temperature of non-zero-slump concrete 16 before casting is preferably 0° C. to 30° C. The fresh non-zero-slump concrete 16 in a preferred embodiment has an air void content of measured by any conventional method (an exemplary standardized test is ASTM C231 for Air Content of Freshly Mixed Concrete by the Pressure Method) should not exceed 15% of the volume of concrete. The compaction factor test is described in BS 1881-103:1993 and BS EN 12350-4:2009 (BS EN 12350-4:2009, Testing fresh concrete Part 4: Degree of compatibility). The non-zero-slump concrete 16 appropriately mixed is now ready for transfer to casting.

(ii) Reinforcement

In a preferred embodiment before casting the non-zero-slump concrete 16 the mould is prepared and reinforcing material such as, carbon steel, stainless steel and/or FRP reinforcement bars are placed inside the mould, if required. The diameter of the bars may vary from 5 mm to 60 mm with yield strength in the range of 100 MPa to 2100 MPa. The reinforcements to be designed in accordance with codes and standards.

(iii) Casting 20, Placement and Setting

The freshly prepared non-zero-slump concrete 16 is transferred by appropriate means and cast in a prepared mould with any known methods in the prior arts. The mould can be made of steel, iron, aluminum, plastic, FRP or other material. The mould should be pre-lubricated prior to casting in order to facilitate the demoulding process 30. The wet-cast concrete or the slag-based intermediate 26 is consolidated within the mould by internal or external vibrators for no more than 120 seconds. The wet-cast concrete or the slag-based intermediate 26 does not need to be pressed or compacted inside the mould. That is the process in a preferred embodiment is free of being pressed or compacted. The slag-based intermediate 26 is allowed to partially or fully set within the mould with a loss of water 32.

The mould is kept at the ambient temperature and humidity, allowing free water 32 to gradually evaporate, and allows the partial or full hydration and setting of the binder. The rate of evaporation depends on the temperature, relative humidity, initial water content of the non-zero-slump concrete 16 mix, surface area of the product and air flow if the mould is exposed to wind. The hydration and setting rate depend on the ingredients and chemical composition of the slag-based binder 14.

In addition to natural evaporation, in a preferred embodiment one or a combination of evaporation and/or heating 31 with heating elements or drum heaters or floor heating mats or fans or heaters or blowers or fan heaters can be used to accelerate the evaporation rate. The heating elements/wires or floor heating mats or drum heaters are installed so as to cover the exterior surfaces of the mould. The elements heat up the mould's walls and eventually increase the evaporation process to reduce the moisture content of the concrete.

Fans, heaters, fan heaters and blowers, are best placed facing toward the slag-based intermediate 26 free surface, which may be its upper surface. These casting 30 steps may continue until initial water-to-binder ratio is reduced by up to 90%, preferably 80%, preferably 70%, preferably 60%, preferably 50%, preferably 40%, preferably 30%, preferably 20%, preferably 10% or preferably 2%. The increase of porosity defined in terms of volume created within the demoulded intermediate 36 by either of the above casting 30 methods in concrete is 70%, preferably 60%, preferably 50%, preferably 40%, preferably 30%, preferably 20%, preferably 10%, preferably 5% or preferably 1% of the concrete volume. The slag-based intermediate 26 eventually attains a second water to binder ratio by weight that is less than the first water to binder ratio by weight of the non-zero-slump concrete 16.

Upon demoulding 30 a demoulded intermediate 36 is produced. The slag-based intermediate 26 can set inside the mould for at least 2 hours but up to 7 days before demoulding. Demoulding may be undertaken in a preferred embodiment when the compressive strength of the concrete is at least 0.01 MPa as the result of the hydration/setting process.

(iv) Pre-Conditioning 40

The process step of pre-conditioning 40 reduces the water content of (the slag-based intermediate 26 now) the demoulded intermediate 36 even further to a third water to binder ratio by weight prior to $CO_2$ curing 50. The demoulded intermediate 36 is kept at the ambient temperature and humidity, allowing free water 42 to gradually evaporates. The rate of evaporation of the demoulded intermediate 36 depends on the temperature, relative humidity, its initial water content, surface area of the product and air flow if the mould is exposed to wind. The pre-conditioning step of the demoulded intermediate 36 can be undertaken in a sealed room, enclosed space chamber or vessel.

In addition to natural evaporation, in a preferred embodiment one or a combination of evaporation and/or heating 41 with heating elements or drum heaters or floor heating mats or fans or heaters or blowers or fan heaters can be used to accelerate the evaporation rate. The heating elements/wires or floor heating mats or drum heaters are installed so as to cover the exterior surfaces of the demoulded intermediate 36. The elements heat up the demoulded intermediate's 36 walls and eventually increase the evaporation process to reduce the moisture content of the concrete. Fans, heaters, fan heaters and blowers, are best placed facing toward the demoulded intermediate's 36 free surface, which may be its upper surface. These preconditioning 40 steps may continue until initial water-to-binder content is reduced by up to 90%, preferably 80%, preferably 70%, preferably 60%, preferably 50%, preferably 40%, preferably 30%, preferably 20%, preferably 10% or preferably 2%. The increase of porosity defined in terms of volume created within the demoulded intermediate 36 by either of the above pre-conditioning 40 methods in concrete is 70%, preferably 60%, preferably 50%, preferably 40%, preferably 30%, preferably 20%, preferably 10%, preferably 5% or preferably 1% of the concrete volume. The pre-conditioning 40 produces a demoulded conditioned slag-based intermediate 46 with a third water to binder ratio by weight. The third water to binder ratio by weight is less than the first water to binder ratio by weight (of the non-zero-slump concrete 16) and is also less than the second water to binder ratio by weight (of the slag-based intermediate 26).

At the end of the pre-conditioning 40 process, the remaining water in the concrete should not fall below 5% of the initial water content by mass.

(v) $CO_2$ Activation\Curing 50

The formed optionally reinforced demoulded conditioned slag-based intermediate 46 products are then placed in a sealed room, chamber or vessel. Carbon dioxide 51 gas is introduced to cure the demoulded conditioned slag-based intermediate 46—at 5%, preferably 10%, preferably 20%, preferably 30%, preferably 40%, preferably 50%, preferably 60%, preferably 70%, preferably 80%, preferably 90%, or preferably 99.5% purity—into the enclosed area, that may be a chamber/enclosed space/vessel/room at ambient temperature. The gauge pressure of the chamber/enclosed space/vessel/room will gradually increase to a range of 0.1 psi to 100 psi.

In a preferred alternative to the curing chamber, the demoulded conditioned slag-based intermediate 46 products can be covered and sealed by airtight fabrics. The $CO_2$ 51 is then introduced into the space created by these fabrics.

The demoulded conditioned slag-based intermediate 46 products are kept pressurized under $CO_2$ gas 51 for no less than 5 minutes, though the $CO_2$ curing 50 process can continue for up to 48 hours, where a preferred embodiment is 8 hours for $CO_2$ curing 50. The chamber/enclosed space/vessel/room's internal temperature will gradually increase by at least 0.1° C. before it decreases as a result of an exothermic, accelerated curing reaction—the "$CO_2$ activation process". At the end of the activation process, the remaining $CO_2$, if any, is vented out.

The following are preferred examples for 1 cubic meter ($m^3$) of the wet-cast slag-based concrete 56 described herein having the following the non-zero-slump concrete properties:

Slag content=600 kg, A first water/binder ratio=0.35; Setting time=18 hours.

Slag content=600 kg; A first water/binder ratio=0.55; Setting time=24 hours.

Slag content=350 kg; A first water/binder ratio=0.45; Setting time=18 hours.

Slag content=400 kg; cement=100 kg; A first water/binder ratio=0.4; Setting time=12 hours.

Slag content=480 kg; A first water/binder ratio=0.45; Setting time=18 hours.

Slag content=650 kg; A first water/binder ratio=0.45; Setting time=24 hours.

Slag content=700 kg; A first water/binder ratio=0.45; Setting time=24 hours.

The present method is not limited to the operable/preferred compositions presented above. Furthermore, if water reducing admixtures (i.e. chemical admixtures 17) are included in the non-zero-slump concrete 16, lower water contents (lower water to binder ratio) may be required.

FIG. 2 schematically represents the step of casting 20 the mixed non-zero-slump concrete 16, into an appropriate mould where at least partial setting occurs. The steps of de-moulding 30 and pre-conditioning 40 are represented by one arrow and the $CO_2$ curing 50 of the demoulded condi-

The invention claimed is:

1. A method of producing a wet-cast slag-based concrete product comprising steps of:
providing a slag-based binder, an aggregate and water;
mixing the slag-based binder, the aggregate and the water to produce a non-zero-slump concrete composition comprising a first water to slag-based binder ratio by weight of greater than 0.2;
casting the non-zero-slump concrete composition by transferring the non-zero-slump concrete composition into a mould;
setting the non-zero-slump concrete composition within the mould and reducing a water content of the non-zero-slump concrete composition while the non-zero-slump concrete composition is within the mould to produce a slag-based intermediate comprising a second water to slag-based binder ratio by weight that is less than the first water to slag-based binder ratio by weight;
demoulding the slag-based intermediate to produce a demoulded intermediate;
pre-conditioning the demoulded intermediate to produce a demoulded pre-conditioned slag-based intermediate comprising a third water to slag-based binder ratio by weight that is less than the first water to slag-based binder ratio by weight and that is also less than the second water to slag-based binder ratio by weight; and
curing the demoulded pre-conditioned slag-based intermediate with carbon dioxide to produce the wet-cast slag-based concrete product, including introducing the carbon dioxide after the mixing, the reducing of the water content, the demoulding, and the pre-conditioning.

2. The method of claim 1, wherein the step of casting of the non-zero-slump concrete composition is free of pressing/compaction other than atmospheric pressure.

3. The method of claim 1, wherein the slag-based binder is a slag—free of or mixed with at least one other binder selected from the group consisting of fly ash, calcinated shale, silica fume, zeolite, GGBF (Ground Granulated Blast Furnace) slag, limestone powder, hydraulic cements and non-hydraulic cements.

4. The method of claim 3, wherein the slag is selected from the group consisting of a steel slag, a stainless steel slag, a basic oxygen converter sludge, blast furnace sludge, a by-product of zinc, iron, or copper production and combinations thereof.

5. The method of claim 1, further comprising a reinforcing step of placing a reinforcing material into the mould before the casting of the non-zero-slump concrete.

6. The method of claim 5, wherein the reinforcing material is carbon steel, stainless steel and/or FRP reinforcement bars.

7. The method of claim 1, wherein a cumulative calcium silicate content of the slag is at least 20 weight %.

8. The method of claim 1, wherein the step of pre-conditioning is conducted to provide an increased porosity of at least 1% of volume of the wet-cast slag-based concrete.

9. The method of claim 1, wherein the non-zero-slump concrete composition has a slump value in a range of 5 mm to 250 mm.

10. The method of claim 1, wherein the non-zero-slump concrete composition has a compaction factor test for fresh concrete ranging from 0.7 to 1.0.

11. The method of claim 1, wherein the slag-based binder is steel slag selected from the group consisting of reducing steel slag, oxidizing steel slag, converter steel slag, electrical arc furnace (EAF) slag, basic oxygen furnace (BOF) slag, ladle slag, fast-cooled steel slag and slow-cooled steel slag and combinations thereof.

12. The method of claim 1, wherein the wet-cast slag-based concrete product is selected from the group consisting of precast, reinforced and non-reinforced concrete pipes, box culverts, drainage products, paving slabs, floor slabs, traffic barriers, walls manholes, retaining wall, pavers, tiles, and shingles.

13. The method of claim 1, wherein the wet-cast slag-based concrete comprises of a slag content of at least 5% by weight.

14. The method of claim 1, wherein the non-zero-slump concrete composition further comprises at least one of accelerator, retarder, viscosity modifying agent, air entertainer, foaming agent, ASR (alkali silica reaction) inhibitor, anti-wash-out, corrosion inhibitor, shrinkage reducer, concrete crack reducer, plasticizer, super plasticizer, sealer, paint, coating, water reducer, water repellant, efflorescence control, polymer powder, polymer latex and workability retainer.

15. The method of claim 1, wherein the non-zero-slump concrete composition further comprises at least one of cellulose fiber, glass fiber, micro synthetic fiber, natural fiber, PP fiber, PVA fiber and steel fiber.

16. The method of claim 1, wherein the curing with carbon dioxide is free of additional external sources of heat and/or steam.

17. The method of claim 1, wherein the step of curing is in a chamber/enclosed space/vessel/room with a gas containing a concentration of $CO_2$ of at least 5% by volume.

18. The method of claim 1, wherein the demoulding of the slag-based intermediate is performed when the demoulded intermediate has a compressive strength of at least 0.01 MPa.